UNITED STATES PATENT OFFICE.

WILLY MARCKWALD, OF BERLIN, GERMANY, ASSIGNOR TO THE CHEMISCHE FABRIK AUF ACTIEN, VORMALS E. SCHERING, OF SAME PLACE.

PROCESS OF OBTAINING PIPERAZIN.

SPECIFICATION forming part of Letters Patent No. 500,665, dated July 4, 1893.

Application filed May 26, 1892. Serial No. 434,469. (Specimens.) Patented in Luxemburg April 4, 1892, No. 1,600.

*To all whom it may concern:*

Be it known that I, WILLY MARCKWALD, a subject of the King of Prussia, residing at Berlin, Prussia, Germany, have invented certain new and useful Improvements in and Relating to the Production of Piperazin, (for which Letters Patent have been obtained in Luxemburg, No. 1,600, dated April 4, 1892;) and I do hereby declare the following to be a full, clear, and exact description of the invention, such as will enable others skilled in the art to which it appertains to make and use the same.

This invention has relation to the production of piperazin, and consists in a novel process of obtaining piperazin and certain intermediate products from which the piperazin is finally obtained. But that my invention may be fully understood I will describe the same in detail.

The process of obtaining piperazin is one in which aromatic disulfonic piperazides

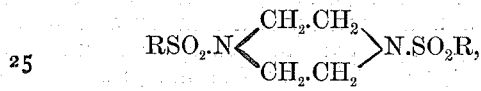

are formed, R indicating a hydrocarbon remainder, $C_6H_5$, $C_6H_4.CH_3$ or $C_{10}H_7$ and these intermediate products may be obtained directly, or from primary aromatic disulfonic ethylene diamides $R.SO_2.NH.CH_2.CH_2NH.SO_2R$ in which R also indicates a hydrocarbon remainder.

The process forming the subject matter of this invention, and hereinafter more fully described, is based upon the discovery that:—
First, the aromatic disulfo ethylene diamides are formed by the action of two molecules of an aromatic sulfochloride or bromide on one molecule of ethylene diamine, or by the action of two molecules of an aromatic sulph-amide on one molecule of ethylene chlorid or bromid; secondly, the above-mentioned aromatic disulfonic piperazides are formed by the action of one molecule of ethylene chlorid or ethylene bromid upon an aromatic disulfo ethylene diamide, and thirdly, the aromatic disulfonic piperazides when mixed with water or hydrochloric acid or a concentrated or attenuated solution of sulfuric acid and heated, split into piperazin and hydrocarbons or their sulfoacids corresponding to the hydrocarbon remainders hereinbefore referred to. The sulfo chlorids or bromids or amides of the fatty series have a similar action, but in view of the high price of these sulfo-chlorids and bromids and their disagreeable properties their use in this process is not so advantageous.

In carrying out my invention I proceed as follows:

*Production of the disulfoethylene diamides.*—These can be obtained as follows:

First. Dibenzenedisulfoethylene diamide: Six kilos ethylenediamide and eight kilos hydrate of soda, or 11.2 kilos hydrate of potash are dissolved in fifty liters of water, and to this solution 35.7 kilos of benzenesulfo-chlorid are added. The solution is heated, while being strongly agitated, to about 80° centigrade, until the benzenedisulfoethylene diamide formed by the reaction becomes a granular compact mass from which the liquid is removed by filtration, and which is then washed, first in an attenuated solution of hydrochloric acid and then in water. The benzenedisulfoethylene diamide is soluble in an attenuated soda lye and is precipitated from the solution even by weak acids. In the above described process one molecule of ethylene diamine and two molecules of an alkali are used; if however, three or four molecules thereof are used then the dibenzenedisulfoethylene diamide is obtained in solution, from which it may be precipitated by means of hydrochloric acid.

Secondly. By dissolving 32.2 kilos benzenesulfamide and 37.6 kilos ethylene bromid, or 19.8 kilos ethylene chlorid in two hundred and fifty kilos alcohol of a strength of about ninety-six per cent. This solution is heated to the boiling point and while boiling forty kilos of soda lye of a strength of about twenty per cent., or fifty kilos of a potash lye of about the same strength are very gradually added. The heating of the solution is continued until it shows but a very weak alkaline reaction. The alcohol is then distilled off, the residue being taken up in an attenuated soda lye which is then filtered and the dibenzenedisulfoethylene diamide precipitated from the filtrate. Instead of allowing the alkali lye to gradually flow into the alkaline solution it may at once be added thereto, though in this case the quantity of the product obtained is not so great. In a precisely similar manner diorthotoluoldisulfoethylene diamide, diparatoluoldisulfoethylene diamide, dixyloldisulfoethylene diamide, dialphanaphthalenedisulfoethylene diamide, and dibetanaphthalenedisulfoethylene diamide may be obtained.

*Production of aromatic disulfonic piperazides:*—These may be obtained as follows:

First. By dissolving thirty-four kilos dibenzoldisulfaethylene diamide and 36.6 kilos ethylene bromid, or 19.8 kilos ethylene chlorid in about two hundred and fifty liters of alcohol of a strength of about ninety-six per cent., the solution is heated and forty kilos of soda lye of about twenty per cent. or fifty-six kilos of potash lye of about the same strength are gradually added thereto. The heating is continued until the solution shows no acid or but a very feeble acid reaction when it is allowed to cool and then filtered from the residues. The latter is first washed in alcohol, then in water, then with a hot attenuated soda lye and finally with water. The benzenedisulfonicpiperazide is thus obtained in the form of a white powder that is very difficult of solution in nearly all solvents.

Secondly. Instead of producing the dibenzenedisulfonicpiperazide from dibenzenedisulfoethylene diamide it may be obtained directly from benzenesulfamide by the action upon two molecules of the amide of two molecules of ethylene chlorid or ethylene bromid and four molecules of an alkali hydrate, then proceeding as above set forth.

By the processes just described the following piperazides may also be obtained:—Diorthotoluenedisulfonic piperazide, diparatoluenedisulfonic piperazide, dixylenedisulfonic piperazide, dialphanaphthalenedisulfonic piperazide, and dibetanaphthalenedisulfonic piperazide.

*Production of piperazin.*—This may be obtained by one or the other of the following methods:

First. Ten kilos of either of the piperazides above enumerated are mixed with fifty kilos of water, or fifty kilos of a solution of hydrochloric acid of a strength of about twenty per cent. and heated in an autoclave to from 200° to 250° centigrade for about six hours. After cooling the hydrocarbon that separated from the solution is removed therefrom and the latter evaporated, whereby the acid sulfate salt of piperazin is directly obtained from which free piperazin can be obtained by combining with the salt an alkali lye or lime and heating the mixture.

Secondly. If an attenuated solution of sulfuric acid is substituted for the water or hydrochloric acid solution as described under first, the sulfuric acid is advantageously removed by means of lime, and free piperazin is obtained in solution.

Thirdly. Instead of an attenuated solution of sulfuric acid a solution thereof of a specific gravity of from 1.7° to 1.85° may be employed; the process being then carried out in an open vessel in which the solution is heated, and in this case the temperature need not be carried to more than from 180° to 200°. Besides piperazin sulfoacids of the hydro-carbons are formed in this process.

Finally, the piperazide can be dissolved in from four to eight parts of sulfuric acid of a specific gravity of from 1.7° to 1.85°. The solution is then heated to from 140° to 150° centigrade and superheated steam introduced, whereby the hydrocarbon is distilled off.

Having thus described my invention, what I claim as new therein, and desire to secure by Letters Patent, is—

1. In the production of piperazin, the process of obtaining aromatic disulfo ethylene diamides, which consists in causing a suitable aromatic sulfo-compound to act upon an ethylene compound in the presence of an alkali and separating the disulfonic ethylene diamide obtained by the reaction, substantially as set forth.

2. In the production of piperazin, the process of obtaining aromatic disulfonic piperazides, which consists in causing an ethylene compound or an aromatic amide to react upon an aromatic sulfo-compound of an amide in the presence of an alkali at a temperature above the normal and separating the aromatic disulfonic piperazide, substantially as set forth.

3. The process of obtaining piperazin, which consists in mixing water or a solution of an inorganic acid with an aromatic sulfo-compound of piperazide, heating the same, whereby the piperazin is split off in the form of an acid sulfate, separating the acid salt of piperazin, and neutralizing the same at a temperature above the normal whereby free piperazin is obtained, substantially as set forth.

4. The process of obtaining piperazin, which consists in causing a salt of ethylene or an aromatic amide to act upon an aromatic sulfo-compound of an amide in the presence of an alkali at a temperature above the normal, whereby an aromatic disulfonic piperazide is obtained, mixing the latter product with water or a solution of an inorganic acid, heating the mixture, whereby the piperazin is split off in the form of an acid sulfate, neutralizing the acid salt of piperazin at a temperature above the normal, and separating the free piperazin obtained, substantially as set forth.

5. The process of obtaining piperazin, which consists in causing an aromatic sulfo-compound to react upon an ethylene salt or compound in the presence of an alakali at a temperature above the normal whereby an aromatic disulfo ethylene diamide is obtained, causing an ethylene salt to act upon the aromatic disulfo-ethylene diamide in the presence of an alkali at a temperature above the normal, whereby an aromatic sulfo compound of piperazide is obtained, mixing the last named product with water or a solution of an inorganic acid and heating the mixture, whereby the piperazin is split off and may be separated substantially as set forth.

WILLY MARCKWALD.

Witnesses:
RICHARD SCHMIDT,
RICHARD JONSCHER.